US012130369B2

(12) United States Patent
Wang et al.

(10) Patent No.: US 12,130,369 B2
(45) Date of Patent: Oct. 29, 2024

(54) ULTRA WIDE-LANE (UWL) REAL-TIME KINEMATIC (RTK)

(71) Applicant: QUALCOMM Incorporated, San Diego, CA (US)

(72) Inventors: Min Wang, Tustin, CA (US); Ning Luo, Cupertino, CA (US); Gengsheng Zhang, Cupertino, CA (US); Zoltan Biacs, San Mateo, CA (US); Mangesh Chansarkar, Irvine, CA (US); Jean-Michel Rousseau, San Diego, CA (US); Dimitri Rubin, Cupertino, CA (US); David Tuck, San Juan Capistrano, CA (US); Yuxiang Peng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 649 days.

(21) Appl. No.: 17/313,486

(22) Filed: May 6, 2021

(65) Prior Publication Data

US 2022/0373696 A1    Nov. 24, 2022

(51) Int. Cl.
*G01S 19/44* (2010.01)
*G01S 19/32* (2010.01)

(52) U.S. Cl.
CPC ........... *G01S 19/44* (2013.01); *G01S 19/32* (2013.01)

(58) Field of Classification Search
CPC ................................ G01S 19/32; G01S 19/44
See application file for complete search history.

(56) References Cited

U.S. PATENT DOCUMENTS

| 2003/0098810 A1* | 5/2003 | Lee ..................... G01S 19/32 244/158.6 |
| 2022/0252732 A1* | 8/2022 | Dai ..................... G01S 19/41 |

(Continued)

FOREIGN PATENT DOCUMENTS

| CN | 103675874 A | * | 3/2014 | ............ G01S 19/44 |
| CN | 108037521 A | * | 5/2018 | |

(Continued)

OTHER PUBLICATIONS

Y. Feng, GNSS three carrier ambiguity resolution using ionosphere-reduced virtual signals, J Geod, vol. 82, p. 847-862 (Year: 2008).*

(Continued)

*Primary Examiner* — Bernarr E Gregory
*Assistant Examiner* — Fred H Mull
(74) *Attorney, Agent, or Firm* — QUALCOMM Incorporated

(57) ABSTRACT

Techniques for Ultra Wide-Lane (UWL) Real-Time Kinematic (RTK) positioning a mobile device may include obtaining, using a multi-band GNSS receiver of the mobile device: a first carrier-phase measurement of a first GNSS signal on a first GNSS carrier frequency, and a second carrier-phase measurement of a second GNSS signal on second GNSS carrier frequency. Techniques may further comprise providing a position estimate of the mobile device, (Continued)

wherein: the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

26 Claims, 11 Drawing Sheets

(56) References Cited

U.S. PATENT DOCUMENTS

2023/0055363 A1* 2/2023 Su .................... G01S 19/23
2024/0012158 A1* 1/2024 Kee .................. G01S 19/40

FOREIGN PATENT DOCUMENTS

| CN | 112285745 A | 1/2021 |
|----|-------------|--------|
| CN | 112462397 A | 3/2021 |

OTHER PUBLICATIONS

V. Duong et al., An assessment of wide-lane ambiguity resolution methods for multi-frequency multi-GNSS precise point positioning , Survey Review, vol. 52(374), p. 442-453 (Year: 2020).*

Manser, M. H. (Ed.). (2011). Such. In Good Word Guide (7th ed.). Bloomsbury. https://search.credoreference.com/articles/Qm9va0FydGljbGU6ODI3Nzc3?aid=279753 (Year: 2011).*

Cocard M., et al., "A Systematic Investigation of Optimal Carrier-Phase Combinations For Modernized Triple-Frequency GPS", Journal of Geodesy, Continuation of Bulletin Geodesique and Manuscripta Geodaetica, Springer, Berlin, DE, vol. 82, No. 9, Jan. 8, 2008, pp. 555-564, XP019620127, pp. 556-557: "integer phase combinations", pp. 559-563: "search for optimal combinations".

International Search Report and Written Opinion—PCT/US2022/071270—ISA/EPO—Nov. 14, 2022.

Collins J.P., "An Overview of GPS Inter-Frequency Carrier Phase Combinations", UNB/GSD, Oct. 1999, pp. 1-15.

Li B., et al., "ERTK: Extra-Wide-Lane RTK of Triple-Frequency GNSS Signals", Journal of Geodesy, Feb. 23, 2017, 18 pages, DOI 10.1007/s00190-017-1006-1.

* cited by examiner

ULTRA WIDE-LANE (UWL) REAL-TIME KINEMATIC (RTK)

BACKGROUND

1. Field of Disclosure

The present disclosure relates generally to the field of satellite-based positioning, and more specifically to Real-Time Kinematic (RTK) positioning.

2. Description of Related Art

RTK positioning is a satellite-based positioning technique used to enhance the precision of position data obtained by a Global Navigation Satellite Systems (GNSS) receiver. The sub-meter-level positioning that RTK positioning can provide typically exceeds the accuracy of traditional consumer-grade GNSS receivers. Thus, RTK positioning can increase the number of applications that consumer-grade GNSS receivers may be used for. However, the relatively long time it takes for RTK positioning to achieve this high accuracy may be a limitation.

BRIEF SUMMARY

An example method of Global Navigation Satellite System (GNSS) positioning of a mobile device, according to this disclosure, comprises obtaining, using a multi-band GNSS receiver of the mobile device a first carrier-phase measurement of a first GNSS signal on a first GNSS carrier frequency, and a second carrier-phase measurement of a second GNSS signal on second GNSS carrier frequency. The method also comprises providing, with the mobile device, a position estimate of the mobile device, wherein: the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

An example mobile device for Global Navigation Satellite System (GNSS) positioning of a mobile device, according to this disclosure, comprises a multi-band GNSS receiver, a memory, and one or more processors communicatively coupled with the multi-band GNSS receiver and the memory. The one or more processing units are further configured to obtain, using a multi-band GNSS receiver of the mobile device: a first carrier-phase measurement of a first GNSS signal on a first GNSS carrier frequency, and a second carrier-phase measurement of a second GNSS signal on second GNSS carrier frequency. The one or more processing units are further configured to provide a position estimate of the mobile device, wherein: the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

An example apparatus for Global Navigation Satellite System (GNSS) positioning of a mobile device, according to this disclosure, comprises means for obtaining, using a multi-band GNSS receiver of the mobile device, a first carrier-phase measurement of a first GNSS signal on a first GNSS carrier frequency, and a second carrier-phase measurement of a second GNSS signal on second GNSS carrier frequency. The apparatus further comprises means for providing, with the mobile device, a position estimate of the mobile device, wherein the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

An example non-transitory computer-readable medium storing instructions for Global Navigation Satellite System (GNSS) positioning of a mobile device, according to this disclosure, includes instructions comprising code for obtaining, using a multi-band GNSS receiver of the mobile device: a first carrier-phase measurement of a first GNSS signal on a first GNSS carrier frequency, and a second carrier-phase measurement of a second GNSS signal on second GNSS carrier frequency. The instructions further comprise code for providing, with the mobile device, a position estimate of the mobile device, wherein: the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

BRIEF DESCRIPTION OF DRAWINGS

Like reference symbols in the various drawings indicate like elements, in accordance with certain example implementations.

DETAILED DESCRIPTION

Figure 1:
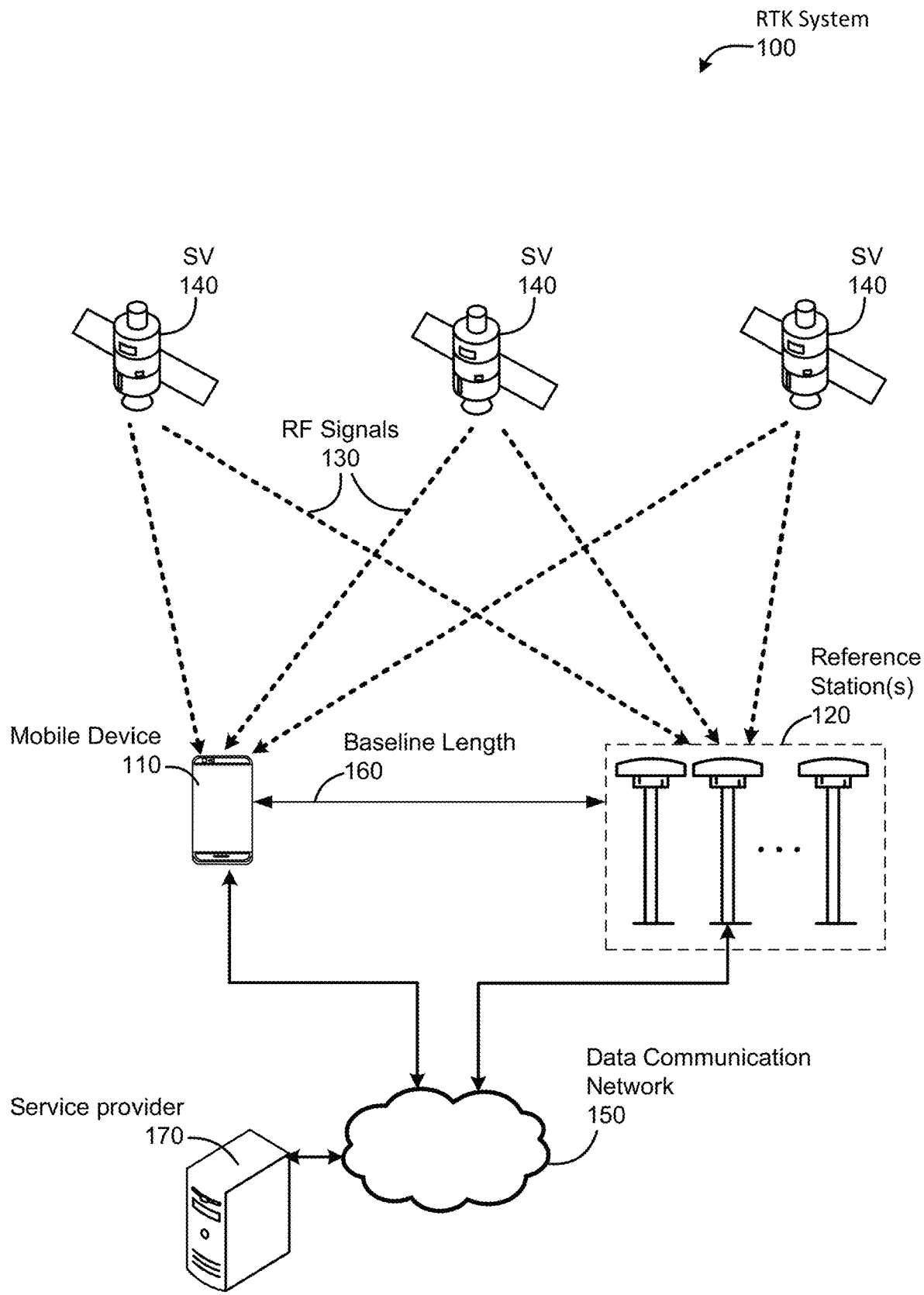
FIG. 1 is a simplified diagram of an Real-Time Kinematic (RTK) system, according to an embodiment.

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure.

As used herein, the terms "position" and "location" are used interchangeably. Further, terms such as "position determination," "position fix," "location estimate," "estimated location," "location fix," and the like are also used interchangeably herein with regard to Global Navigation Satellite Systems (GNSS)-based positioning to refer to an estimated position of a mobile device or other device comprising a GNSS receiver. The position or location may be a two-dimensional position, e.g., with regard to two-dimensional map, or a three-dimensional position.

Additionally, as used herein, the term "correction data" may refer to corrective information provided by an Real-Time Kinematic (RTK) service provided to enable a high-accuracy position determination of a device having a GNSS receiver. Correction data can include measurement data taken by a reference station and/or corrective information derived from the measurement data, such as a difference between a true range determination, based on a known location of a reference station, and a measurement taken at the reference station. Corrective data can be used as described herein, along with measurements taken at the device having the GNSS receiver, to determine the high-accuracy position of the device.

As used herein, a "positioning engine" refers to one or more components (e.g., software components or modules) that perform positioning techniques to determine location data of a mobile device. In a typical embodiment, a positioning engine for a mobile device is executed by one or more processing units of the mobile device. A positioning engine that provides RTK positioning (also referred to herein as a "Precise Positioning Engine (PPE)") generally operates by obtaining GNSS data from radio frequency (RF) signals from one or more GNSS constellations, and further applying correction data obtained from a network of reference stations (as described in more detail hereafter) to apply various corrections to the GNSS data to further determine a precise position. More particularly, RTK positioning uses carrier-based ranging by determining the number of carrier cycles between a satellite and mobile device (e.g., carrier phase measurements, including changes in phase and the number of cycles of the carrier signals).

A positioning engine may use, for example, a Bayesian estimator to determine the one or more RTK positions of a mobile device. Examples of Bayesian estimators that may be used include a Kalman Filter, an Extended Kalman Filter, an Unscented Kalman Filter, a particle filter, or the like. It should be noted that, as used herein, "Kalman Filter" is intended to refer to various types of Kalman Filters, such as an Extended Kalman Filter, an Unscented Kalman Filter, or the like. In some embodiments, an estimator may be used to iteratively determine states which corresponded to a predicted device location over a series of time steps. Continuing with this example, the Bayesian estimator may be iteratively updated (e.g., states of the estimator may be iteratively updated) to identify a solution. The solution of the estimator may correspond to an RTK position of a mobile device at a time point at which the estimator has converged.

It should be noted that a positioning engine as used herein may be implemented as one or more modules. For example, in some embodiments, a positioning engine may be implemented as two or more modules. As a more particular example, in some embodiments, a first module may receive position information and perform various pre-processing techniques on the position information. Continuing with this more particular example, in some embodiments, a second module may correspond to a Bayesian estimator that estimates one or more RTK positions based on the position information. Conversely, in some embodiments, a positioning engine may be implemented as one module. It should be understood that the methods, systems, apparatuses, media, and techniques described herein may be implemented using any suitable number of modules or engines.

As described in further detail hereafter, techniques described herein allow for fast and accurate RTK positioning of a mobile device. In particular, techniques provided herein can enable mobile devices experiencing a high degree of pseudo-range noise to obtain a position having a decimeter-level accuracy, often within a single epoch (e.g., iterative period for which the position engine provides an estimated position). Such mobile devices may comprise any electronic device having a GNSS receiver being capable of RTK positioning. As detailed further hereafter, embodiments may be particularly beneficial to mobile electronic devices having relatively small antennas, such as mobile phones, smart watches, tracking devices, etc. First, however, FIG. 1 offers some additional detail with regard to RTK positioning.

FIG. 1 is a simplified diagram of an RTK system, according to an embodiment. As noted, RTK system 100 enables a highly accurate (e.g., sub-meter) GNSS position fix of a mobile device 110 (also known as a "rover station" or "rover") by using GNSS receivers at both the mobile device 110 and one or more reference stations 120 (also known as "base stations") that receive radio frequency (RF) signals 130 from satellite vehicles (SVs) 140 (GNSS satellites) from one or more GNSS constellations (e.g., Global Position System (GPS), Galileo (GAL), GLONASS, Beidou (BDS), etc.). Types of mobile devices 110 used may vary, depending on application, and may include any of a variety of types of devices having access to GNSS positioning data, such as mobile devices equipped with GNSS receivers. As indicated previously, such mobile devices may include consumer electronics or other mobile consumer devices, such as a mobile phone, tablet, laptop, wearable device, tracking device, vehicle, or the like. In some embodiments, the mobile device 110 may comprise industrial equipment, such as survey equipment.

In traditional GNSS-based positioning, the mobile device 110 can use code-based positioning to determine a distance of each of the SVs 140 based on a determined delay in a generated pseudorandom binary sequence received in the RF signals 130. RF signals 130 may be transmitted on different carrier frequencies, and a mobile device 110 may use RF signals 130 on multiple carrier frequencies to increase the accuracy of a position fix. In GPS, the carrier frequencies include L1 with a frequency of 1.5754 GHz and a wavelength of 0.1903 m, L2 with a frequency of 1.2276 GHz and a wavelength of 0.2442 m, and L5 with a frequency of 1.1765 GHz and a wavelength of 0.2548 m. Other GNSS constellations have different sets of carrier frequencies. The mobile device 110 can accurately calculate the location of each SV 140 at a specific moment in time using ephemeris (or navigation) data regarding the SVs 140. With the distance and location information of the SVs 140, the mobile device 110 can then determine a position fix for its location using traditional GNSS techniques.

This position fix may be determined, for example, by a Standalone Positioning Engine (SPE) executed by one or more processors of the mobile device 110. However, the resulting accuracy of the position fix for mobile device 110 is subject to errors caused by SV 140 orbit and clock, ionosphere and troposphere delays, and other phenomena. Although this can provide accuracy on the order of meters, this accuracy may be insufficient for many applications.

The RTK system 100 can support RTK-based positioning can provide a position fix with a much higher accuracy than traditional GNSS-based positioning (e.g., on the order of centimeters or decimeters) by using carrier-based ranging based on the carrier wave of the RF signals 130. RTK positioning can use a reference station 120 to make measurements of RF signals 130 with a highly-accurate GNSS receiver from a known location. RTK correction data (also known as "RTK service data") includes highly-accurate carrier-based ranging, which may be provided to a service provider 170 and relayed to the mobile device 110 via radio broadcasts and/or data communication network 150 (e.g., the Internet). The mobile device 110 can then use the RTK correction data to correct errors in its own carrier-based ranging using measurements of the RF signals 130 from its own GNSS receiver. Error correction for RTK positioning can include correction of satellite clock and orbit, ionospheric and tropospheric delays, phase wind-up, site displacement including solid earth tide, ocean loading, and/or pole tide. This more accurate position fix (i.e., position) may be determined, for example, by a Precise Positioning Engine (PPE) executed by one or more processors of the mobile device 110. More specifically, in addition to the information provided to an SPE, the PPE may use RTK correction data, to provide a high accuracy, carrier-based position fix. Several GNSS techniques can be adopted in PPE, including RTK and/or other techniques such as Differential GNSS (DGNSS) and Precise Point Positioning (PPP). The accuracy of the RTK-based position fix for the mobile device 110 can depend on its distance, or baseline length 160, from the reference station 120; the accuracy of the differential corrections; and the like. Although traditional RTK correction has been limited to a baseline length 160 on the order of kilometers or tens of kilometers, new techniques may extend the baseline length 160 to far greater distances using enhanced techniques for error correction.

RTK positioning may involve using network-based techniques. In network-based RTK, correction data from a plurality of reference stations 120 is sent to a service provider 170. The mobile device 110 can then receive on-demand RTK correction data by sending a request to the service provider 170, including an approximate location of the mobile device 110 (e.g., based on a previously-known position, non-GNSS-based positioning (such as a tracking area in a wireless communications network or dead reckoning-based positioning of a vehicle), etc.). The service provider 170, which may comprise one or more computer servers, can then provide customized RTK service data for the mobile device 110 by interpolating the correction data from the plurality of reference stations 120 to provide RTK correction data for the approximate location of the mobile device 110.

As noted, to determine an RTK-based position estimation, a mobile device 110 can use a location/position estimator or positioning engine (e.g., PPE) based on a Kalman Filter, Weighted Least Squares (WLS), a particle filter, or the like, to determine a position estimation that incorporates ambiguity resolution and differential correction. A location/position estimator or positioning engine is typically updated every measurement cycle, or epoch, which is typically once per second. During each cycle, embodiments may employ two phases of computation for each measurement epoch: a prediction phase and an update phase. Additionally, the location/position estimator of the mobile device 110 may predict and update its estimated position and a predicted estimated covariance (often simply called the covariance or estimate covariance), representing the estimated accuracy of the estimated position.

Ambiguity resolution, which involves solving for the unknown number of integer carrier cycles biasing a phase measurement, is a part of the process to determine carrier phase measurements for high accuracy RTK positioning. Once the ambiguity is resolved (known as "ambiguity resolution" or "ambiguity fixing"), a low-noise carrier phase measurement can be used as a range signal. Ambiguity resolution, however, can take a long time due in part to averaging of multipath error and receiver noise. And because certain mobile platforms have higher multipath error and/or receiver noise, ambiguity resolution can be particularly challenging for these platforms. FIGS. 2A-3B illustrate an example.

Figure 2A:
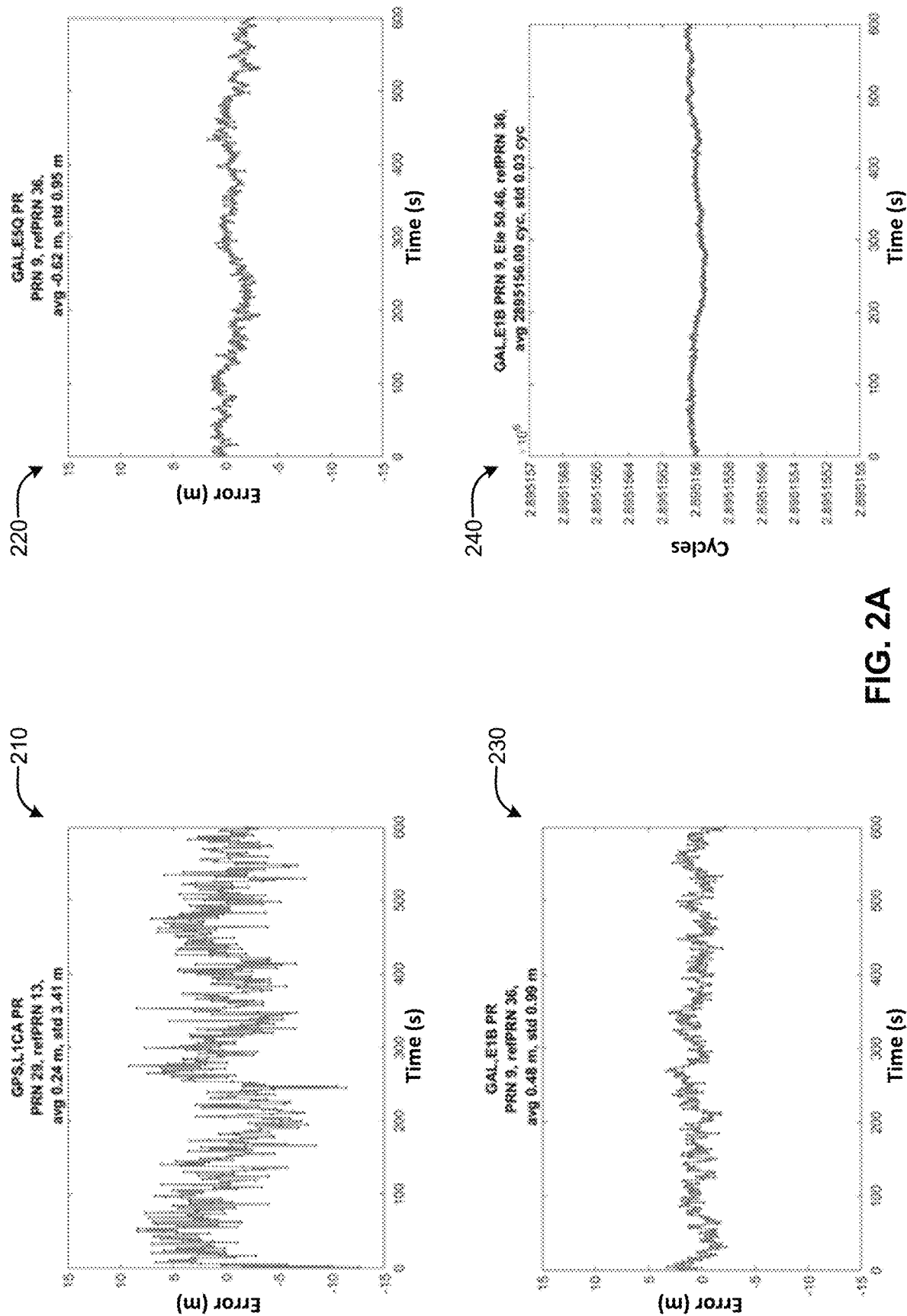
FIGS. 2A-2B are a series of graphs illustrative of measurement quality and RTK fixing for an automotive platform, according to an example.
Figure 2B:
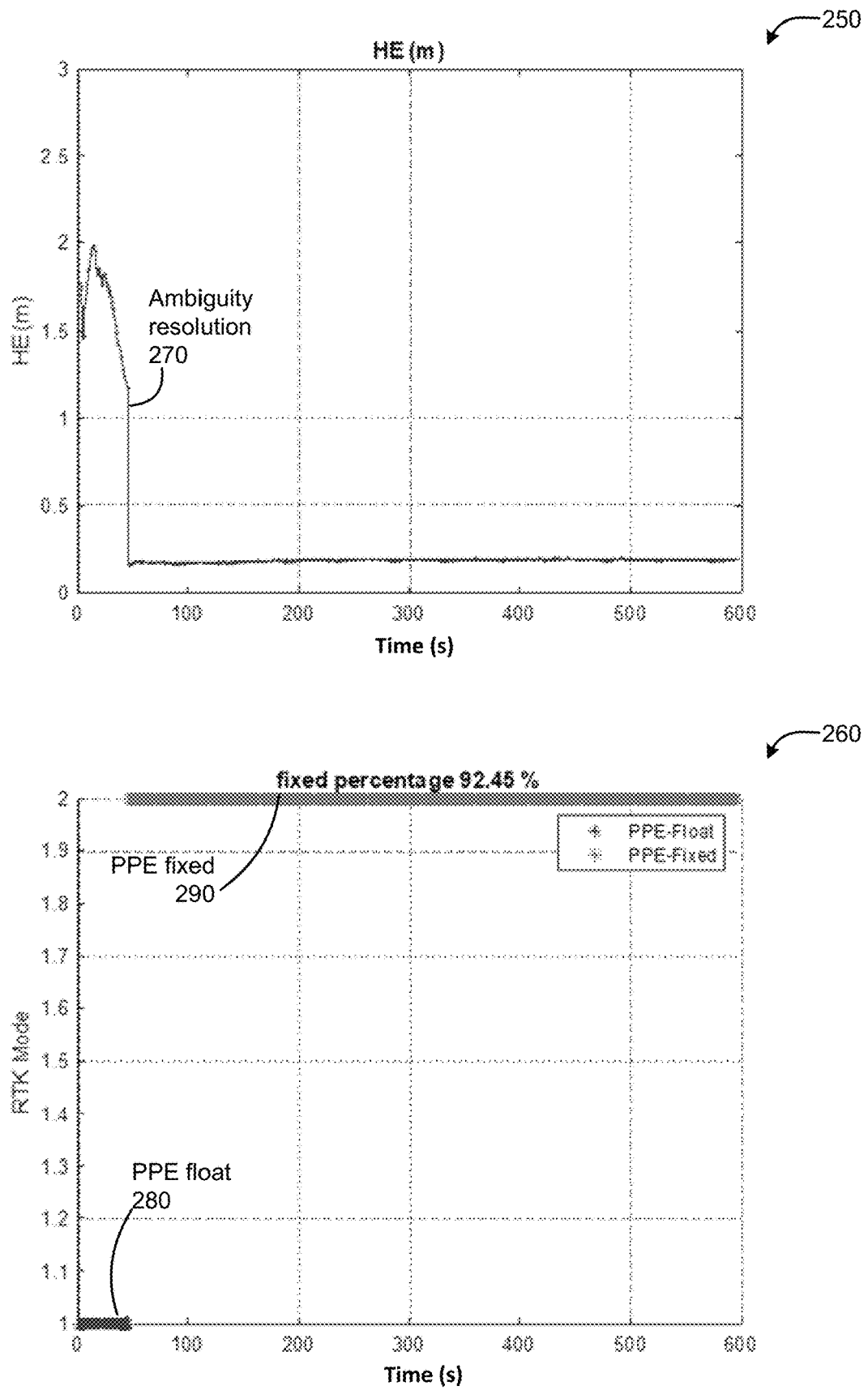

FIGS. 2A-2B are a series of graphs illustrative of measurement quality and RTK fixing for an automotive platform, according to an example. In this example, the automotive platform uses a Right Hand Circular Polarized (RHCP) patch antenna that has a high quality relative to cellular phones and other smaller mobile devices. Accordingly, the receiver noise and multipath error experienced by this automotive platform is lower than other mobile platforms.

FIG. 2A includes a series of graphs illustrating example measurement quality for the automotive platform. Graphs 210, 220, and 230 illustrate pseudo-range residual error due to multipath error and receiver noise over time for different GNSS carrier frequencies. More specifically, values for graphs 210, 220, and 230 were obtained by removing geometry range determined with ground-truth position from a double-differenced pseudo-range that removes the geometry range determined with ground-truth position to obtain the pseudo-range residual error, which reflects the pseudo-range noise/multipath. The values for graph 240 which plots carrier phase residual error over time, were obtained similarly.

These graphs, when compared with similar graphs from measurements using a mobile platform (discussed hereafter with regard to FIG. 3A) show how the automotive platform may experience relatively little multipath error and receiver noise. Graph 210 plots pseudo-range residual error over time measured by the automotive platform for the GPS L1 CA pseudo-range. Graph 210 shows an average pseudo-range residual error of 0.24 m, with a standard deviation of 3.41 m. Graph 220 plots pseudo-range residual error over time measured by the automotive platform for the Galileo E5A pseudo-range. Graph 220 shows an average pseudo-range residual error of −0.62 m with a standard deviation of 0.95 m. Graph 230 plots pseudo-range residual error over time measured by the automotive platform for the Galileo E1B pseudo-range. Graph 230 shows an average pseudo-range residual error of 0.48 m, with a standard deviation of 0.99 m. The standard deviation for graphs 210-230 can be seen as an indicator of measurement quality for the automotive platform. Finally, graph 240 illustrates carrier phase residual error over time corresponding to Galileo E1B, which is representative of the carrier phase residual error of other signal types. Here, the standard deviation of 0.03 cycles can be seen as an indicator of the carrier phase quality. Also, no abrupt changes in cycles show that no cycle slipping is occurring, resulting in continuous carrier phase tracking.

FIG. 2B illustrates additional graphs 250 and 260 that illustrate a timeline for ambiguity fixing for the automotive platform, using signals having similar measurement quality of those illustrated in graphs 210-240 of FIG. 2A. Graph 250 plots horizontal error (HE) in meters over time in seconds. As can be seen, within one minute (at approximately 40 seconds) ambiguity resolution 270 occurs, and the horizontal error drops from over 1 m to approximately 0.2 m. The horizontal error remains at roughly 0.2 m for the remainder of the time in the example. Graph 260 corresponds in time to graph 250, showing how and RTK mode changed, at the moment of ambiguity resolution, from PPE "float" mode 280 (where the ambiguity has not yet been resolved) a PPE "fixed" mode 290 (the ambiguity has been resolved).

Figure 3A:
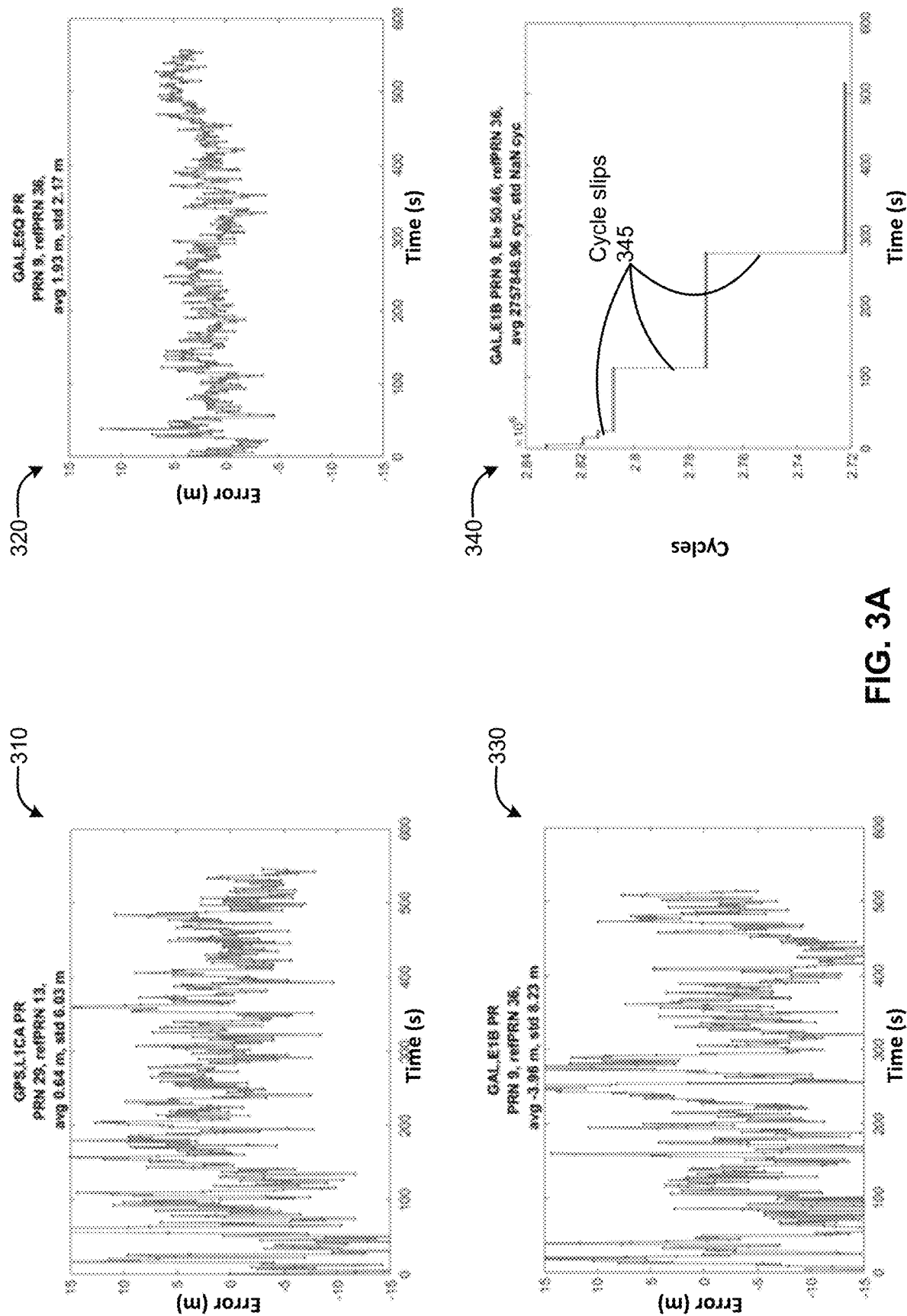
FIGS. 3A-3B are a series of graphs illustrating measurement quality and RTK fixing for a mobile platform used in mobile phones and other small consumer-grade electronics, according to an example.
Figure 3B:
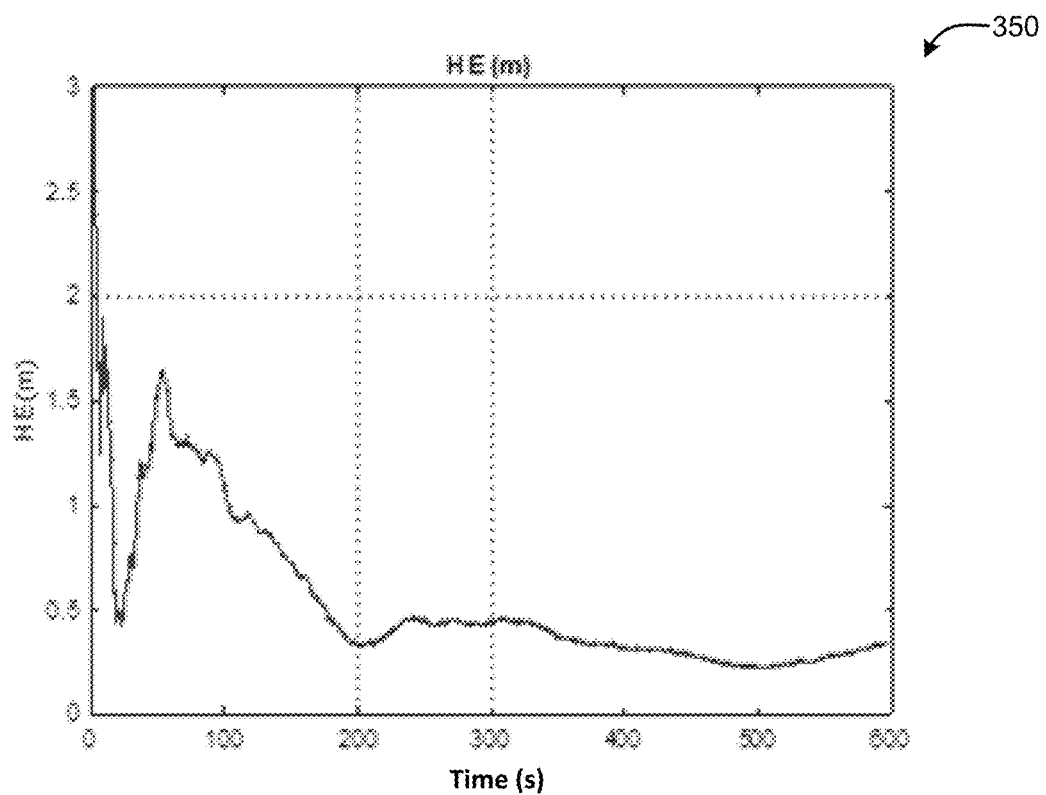
Figure 3B:
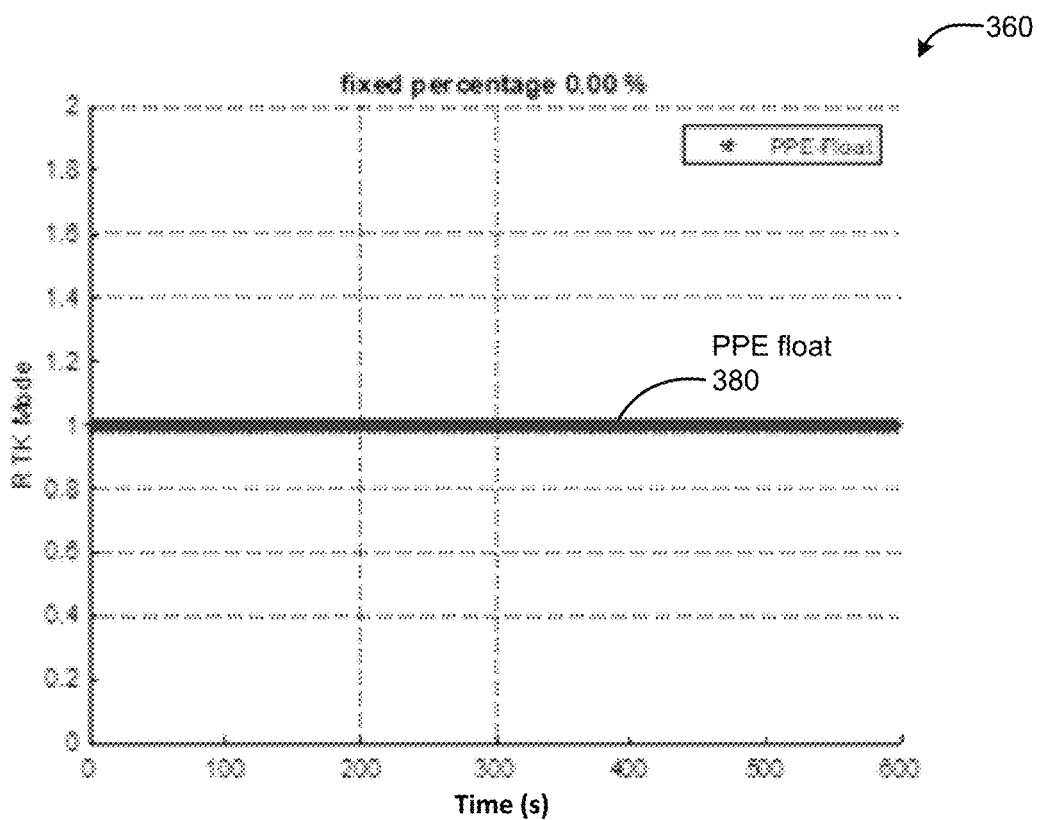

FIGS. 3A-3B are a series of graphs, provided in contrast to FIGS. 2A-2B, illustrating measurement quality and RTK fixing for a mobile platform used in mobile phones and other small consumer-grade electronics, according to an example. In this example, the platform is nearly identical to the platform used for FIGS. 2A-2B, except for the use of a much poorer-quality antenna. As explained hereafter, this leads to the mobile platform being unable to resolve ambiguity for an RTK position.

FIG. 3A includes a series of graphs, similar to FIG. 2A, illustrating example measurement quality for the mobile platform. Graphs 310, 320, and 330 illustrate pseudo-range residual error due to multipath error and receiver noise over time for different GNSS pseudo-ranges, corresponding to graphs 210, 220, and 230 of FIG. 2A, respectively. The graph 310 corresponding to the GPS L1 CA pseudo-range shows an average pseudo-range residual error of 0.64 m, with a standard deviation of 6.03 m, graph 320 corresponding to the Galileo E5A pseudo-range shows an average pseudo-range residual error of 1.93 m with a standard deviation of 2.17 m, and graphs 330 corresponding to the Galileo E1B pseudo-range shows an average pseudo-range residual error of −3.96 m, with a standard deviation of 8.23 m. is can be seen, the measurement error (e.g., standard deviation) of graphs 310-330 is far larger than the pseudo-range residual error of corresponding graphs 210-230. Further, graph 340 (similar to graph 240 in FIG. 2A), carrier phase residual error corresponding to Galileo E1B shows multiple cycle slips 345. Further, although not plotted in graph 340, the standard deviation of graph 340 will be much larger than that of the corresponding graph 240.

FIG. 3B illustrates additional graphs 350 and 360 that, similar to the graphs 250 and 260 of FIG. 2B, illustrate a timeline for (attempted) ambiguity fixing for the mobile platform, using signals having similar measurement quality of those illustrated in graphs 310-340 of FIG. 3A. Similar to graph 250, graph 350 plots HE in meters over time in seconds. Unlike graph 250, however, there is no single point at which ambiguity is resolved. Indeed, graph 350 shows no ambiguity resolution occurring at all. (Graph 360, therefore, shows how the PPE remains in a float mode 380 without ever changing to a fixed mode.) Instead, the increased accuracy over time relies on ambiguity convergence rather than ambiguity resolution. It takes approximately 175 seconds for the HE to fall below and remain under 0.5 m. Further, the HE never reaches the accuracy achieved on the automotive platform (approximately 0.2 m) shown in graph 250. Thus, the mobile platform does achieve some benefit of RTK positioning resulting in a higher accuracy than traditional GNSS positioning, although it takes a relatively long time. More generally, it is not uncommon for RTK positioning on a mobile platform to take five minutes or longer to achieve and maintain decimeter-level accuracy (e.g., below 0.5 m), and accuracy results may not be consistent.

To address these and other issues, embodiments herein utilize a Wide-Lane (WL) combination ambiguity resolution techniques to enable ambiguity resolution instantaneously (e.g., within one epoch) or near-instantaneously (e.g., within a few epochs). Because the effective wavelength of WL combinations used herein are typically much larger than traditional WL combinations, the WL combinations used herein are also referred to as "Ultra Wide-Lane" (UWL) combinations. As described in further detail hereafter, techniques for RTK positioning described herein may utilize a WL combination from carrier-phase measurements of two GNSS carrier frequencies, where the combination includes a balance of a relatively large effective wavelength (e.g., 3 m or more) with an estimated wavelength noise/multipath error that does not exceed a certain threshold (e.g., approximately 2 m). New tri-band, quad-band, and multi-band GNSS antennas can enable new frequency combinations to achieve this balance.

A WL combination is a combination of GNSS signals on two different GNSS carrier frequencies that result in an effective wavelength that is larger than the wavelength of either of the two GNSS carrier frequencies. For example, for two carrier frequencies Li and Lj, signals may be represented as:

$$\nabla\Delta\Phi_{Li} = \nabla\Delta\rho + \lambda_{Li} \cdot \nabla\Delta N_{Li} + \epsilon_{\nabla\Delta\Phi_{Li}}, \text{ and}$$

$$\nabla\Delta\Phi_{Lj} = \nabla\Delta\rho + \lambda_{Lj} \cdot \nabla\Delta N_{Lj} + \epsilon_{\nabla\Delta\Phi_{Lj}}, \qquad (1)$$

where $\Phi$ is carrier phase measurement in meters, $\nabla\Delta$ is the double-differencing operator, $\rho$ is the geometry range, N is the integer ambiguity, $\lambda$ is the signal wavelength in meters, and $\epsilon$ represents the signal noise/multipath for the signal. The WL combination of the two signals represented by equations (1) is then:

$$\nabla\Delta\Phi_{WL} = \frac{f_i}{f_i - f_j}\nabla\Delta\Phi_{Li} - \frac{f_j}{f_i - f_j}\nabla\Delta\Phi_{Lj} = \nabla\Delta\rho + \lambda_{WL}\nabla\Delta N_{WL} + \epsilon_{\nabla\Delta\Phi_{WL}} \qquad (2)$$

The WL combination with an effective wavelength ($\lambda_{WL}$) that is larger than the wavelength of either of the two carrier frequencies ($\lambda_{Li}$ and $\lambda_{Lj}$). For RTK ambiguity fixing, the search space for the ambiguity term is inversely proportional to the wavelength. And thus, the WL combination drastically reduces the search space for the ambiguity term. In many cases, this can enable the ambiguity term to be calculated where it would not otherwise be calculated (e.g., in the example of FIGS. 3A and 3B). More generally, a WL combination can drastically speed up the ambiguity term calculation.

A trade-off of the WL combination is an amplification of noise. By variance law, the standard deviation (STD) of the formed WL combination noise/multipath (assuming a Gaussian) can be obtained as follows:

$$Std^2(\epsilon_{\nabla\Delta\Phi_{WL}}) = \left(\frac{f_i}{f_i - f_j}\right)^2 * Std^2(\epsilon_{\nabla\Delta\Phi_{Li}}) + \left(\frac{f_j}{f_i - f_j}\right)^2 * Std^2(\epsilon_{\nabla\Delta\Phi_{Lj}}) \qquad (3)$$

As an example, the WL combination of GPS L1 and L2 bands can be computed as follows. The STD value of individual signal for mobile platform, based on measured values, is assumed to be 10% of the carrier phase wavelength. Thus, for GPS L1 with a wavelength of 19 cm, Std($\epsilon_{\nabla\Delta\Phi_{Li}}$)≈1.9 cm. For GPS L2 with a wavelength $\nabla$ of 24 cm, td($\epsilon \nabla_{\Delta\Phi_{Lj}}$)≈2.4 cm. Further, $f_i$=154f0 for GPS L1 and $f_j$=120f0 for GPS L2, where f0=10.23 MHz. The STD value of the WL combination of GPS L1 and L2, then, can be obtained using equation (3) as follows:

$$Std(\epsilon_{\nabla\Delta\Phi_{WL}}) = \sqrt{\left(\frac{f_i}{f_i - f_j}\right)^2 * Std^2(\epsilon_{\nabla\Delta\Phi_{Li}}) + \left(\frac{f_j}{f_i - f_j}\right)^2 * Std^2(\epsilon_{\nabla\Delta\Phi_{Lj}})} \approx \qquad (4)$$

$$\sqrt{\left(\frac{154}{154-120}\right)^2 * (0.019)^2 + \left(\frac{120}{154-120}\right)^2 * (0.024)^2} = 0.12 \text{ m.}$$

Another approach to determining the amplified noise of the WL combination is to determine a scale factor for the WL combination. To roughly calculate the STD value of the WL combination, it can be assumed that:

$$Std(\epsilon_{\nabla\Delta\Phi_{Li}}) \approx Std(\epsilon_{\nabla\Delta\Phi_{Lj}}). \qquad (5)$$

Using equation (3), this can result in:

$$Std(\epsilon_{\nabla\Delta\Phi_{WL}}) = \sqrt{\left(\frac{f_i}{f_i - f_j}\right)^2 + \left(\frac{f_j}{f_i - f_j}\right)^2} * Std(\epsilon_{\nabla\Delta\Phi_{Li}}) = S * Std(\epsilon_{\nabla\Delta\Phi_{Li}}), \qquad (6)$$

where the scale factor, S, is:

$$S = \sqrt{\left(\frac{f_i}{f_i - f_j}\right)^2 + \left(\frac{f_j}{f_i - f_j}\right)^2}. \qquad (7)$$

For the WL combination of GPS L1 and L2, the scale factor value is about 5.74.

Figure 4:
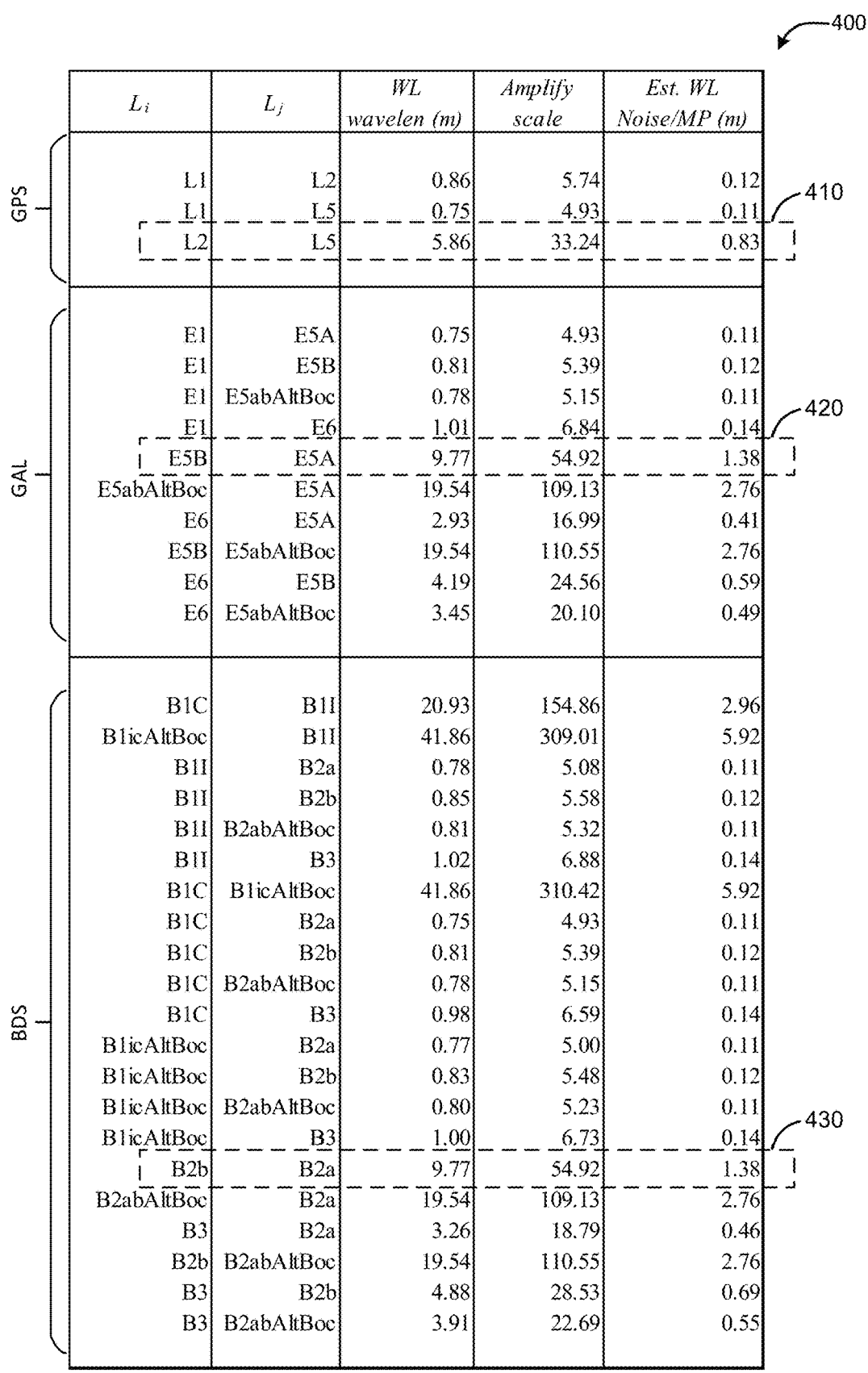
FIG. 4 is a table of effective Wide-Lane (WL) wavelength, scale factor (S), and standard deviation (STD) of the formed WL combination for various WL combinations.

FIG. 4 is a table 400 of effective WL wavelength, scale factor (S), and standard deviation (STD) of the formed WL combination (referred to herein as "WL noise/MP"), for various WL combinations calculated in the manner previously described. (WL noise/MP values in the last column reflect and STD value of 10% for a mobile platform.) WL combinations are made for the various carrier frequencies of GPS, Galileo (GAL), and Beidou (BDS). Similar calculations may be made for other GNSS systems. Further, the introduction of additional carrier frequencies within a constellation can result in additional possible combinations of carrier frequencies for UWL combinations as used by embodiments described herein.

As previously noted, embodiments can use "UWL" combinations (WL combinations meeting the criteria described herein) to help ensure quick ambiguity resolution while maintaining a high degree of accuracy. Here, a UWL combination comprises a WL combination that balances a relatively large wavelength (which reduces the search space) with a scale factor or WL noise/MP below a threshold amount (to maintain high accuracy). Because the scale factor or WL noise/MP is proportional to the wavelength, WL combinations with larger wavelengths may have a scale factor or WL noise/MP that exceeds a desirable threshold. Thus, embodiments may utilize UWL combinations that comprise WL combinations within a range that suitably balances these values. As previously noted, some embodiments may use a UWL combination having an effective wavelength of greater than 3 m and an estimated wavelength noise/multipath error that does not exceed a certain threshold. An estimated wavelength noise/multipath error of 2 m, for example, would still be better than the STD values in graphs 310-330 of FIG. 3A, and would therefore offer benefits over embodiments that do not employ a UWL combination. Boxes 410, 420, and 430 in FIG. 4 identify examples of a UWL combination in the table 400 for each constellation that meets these thresholds. As can be seen, other combinations also meet these thresholds.

Figure 5:
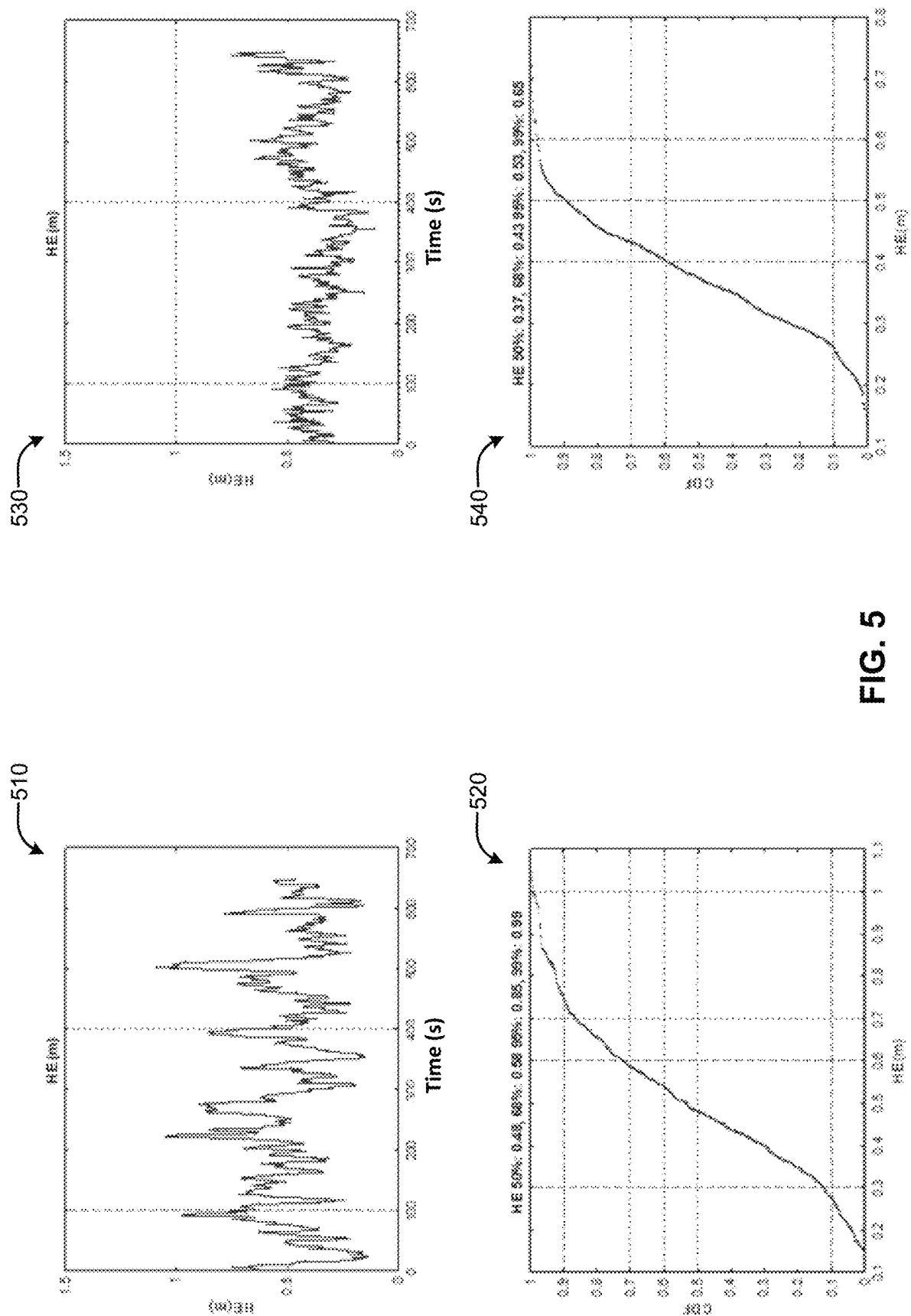
FIG. 5 is a series of graphs that show accuracy improvements from using an Ultra-Wide Lane (UWL) combination for ambiguity fixing in the manner described herein.

FIG. 5 is a series of graphs 510-540 that show accuracy improvements from using a UWL combination for ambiguity fixing in the manner described herein. Graphs 510 and 520 illustrate traditional RTK results using GPS L1/L2/L5, GAL E1/E5A/E5B, and BDS B1I/B2A. Graphs 530 and 540 illustrate results using these same carrier frequencies, as well as UWL combinations of GPS L2 and L5 and GAL E5A and E5B. Results are simulated from actual data captured by a mobile platform (similar to the one used for FIGS. 3A and 3B) in an open-sky environment, with an RTK baseline length of 1.6 km. To test the speed of ambiguity fixing, the positioning engine (PPE) was reset every five seconds.

The traditional RTK results were as expected. Graph 510, which illustrates HE over time, shows HE values varying over the course of approximately 11 minutes from roughly 0.2 m to 1.1 m. The Cumulative Distribution Function (CDF) of the HE shown in graph 520 shows how approximately half the HE values are greater than 0.5 m.

The graphs 530 and 540 show UWL combination results, indicating a clear improvement. Chart 530, which shows HE over time, shows HE values varying from approximately 0.2 m to approximately 0.75 m, with most HE values staying below 0.5 m. The corresponding CDF shown in graph 540 affirms this, indicating that roughly 90% of all values are below 0.5 m.

Accordingly, the use of UWL combination in the manner described herein can expand the applications for which RTK positioning is used in various mobile platforms by enabling fast (often instantaneous) ambiguity resolution that results in a decimeter-level position determination. As previously noted, this can be particularly useful in circumstances and/or on platforms in which pseudo-range noise is high. In particular, UWL combination in the manner described herein may enable instantaneous (e.g., ambiguity fixing within a single epoch) or near-instantaneous (ambiguity fixing within a few epochs) decimeter-level position determination with a consumer-grade mobile phone, for example. For mobile phones, this can enable faster position determination than traditional RTK and more accurate position determination than traditional GNSS.

Figure 6:
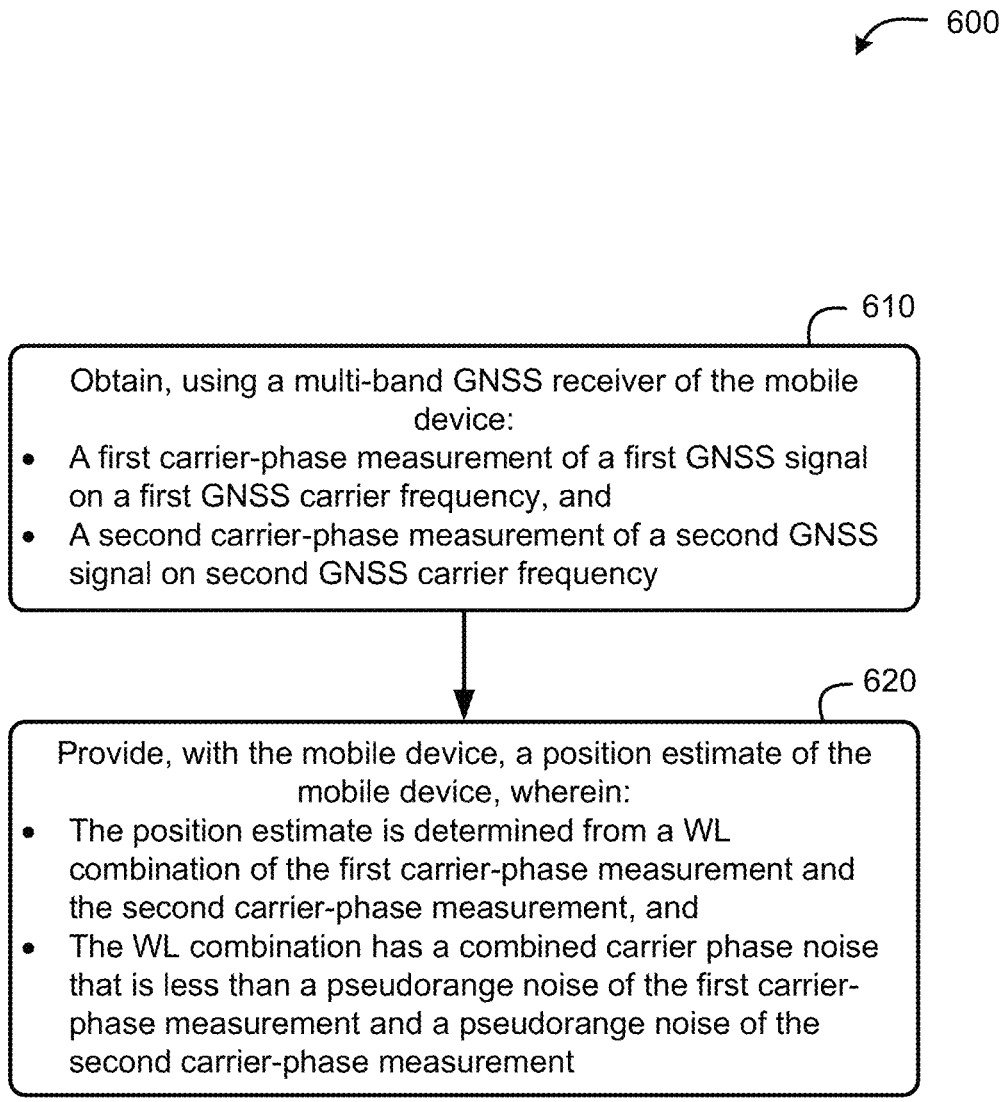
FIG. 6 is a flow diagram of a method of RTK positioning of a mobile device using a UWL combination, according to an embodiment.
Figure 8:
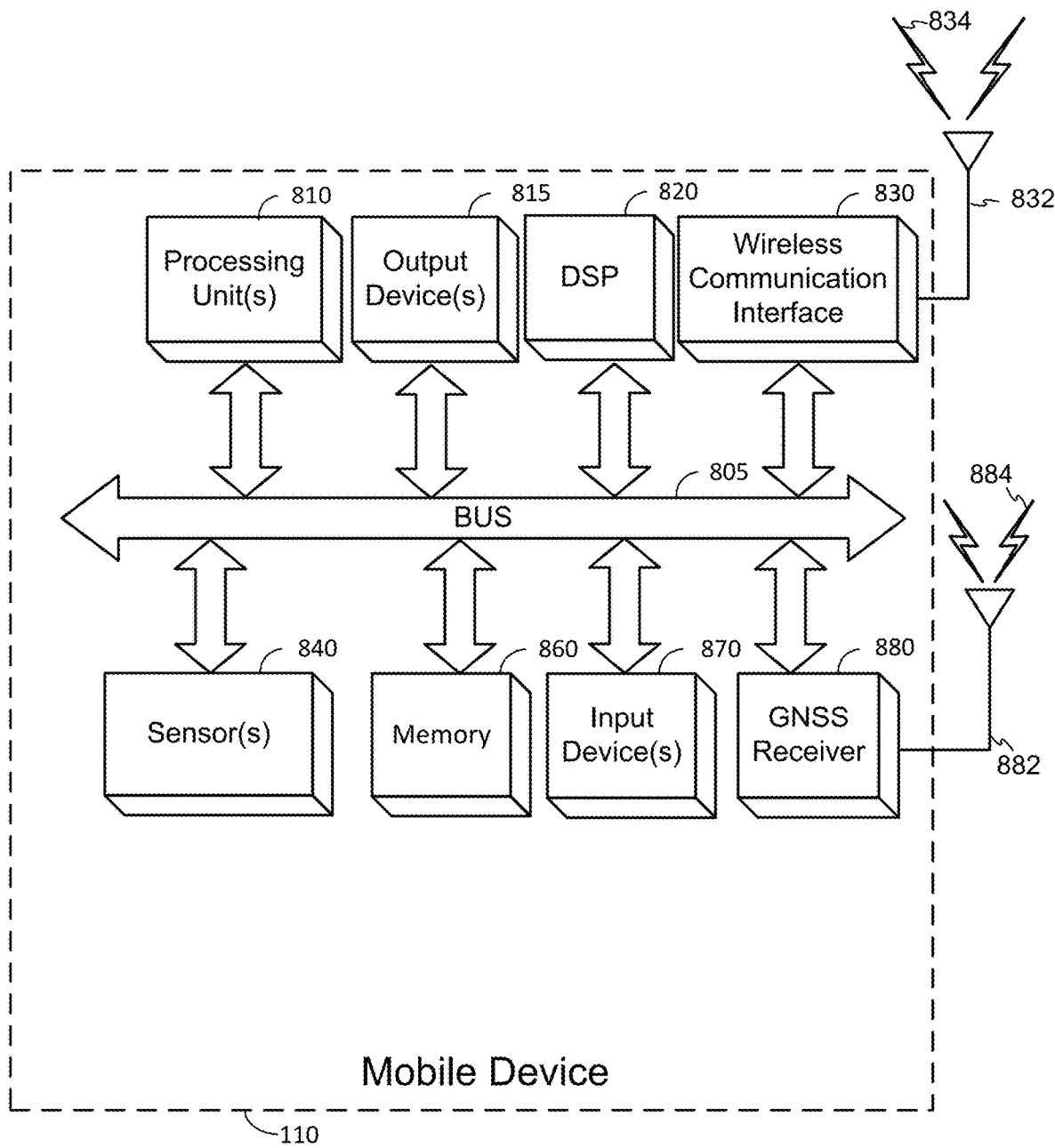
FIG. 8 is a block diagram of various hardware and software components of a mobile device, according to an embodiment.

FIG. 6 is a flow diagram of a method 600 of GNSS positioning of a mobile device, according to an embodiment. The method 600 may incorporate one or more aspects of the embodiments described above for the use of UWL combination for positioning a mobile device. (The WL combination performed at block 620, described in more detail below, may therefore correspond to a UWL combination as described earlier.) According to some embodiments, the mobile device may comprise a mobile phone. Means for performing the functionality illustrated in one or more of the blocks shown in FIG. 6 may be performed by hardware and/or software components of a mobile device. Example components of a mobile device are illustrated in FIG. 8, which is described in more detail below.

It can be noted that GNSS positioning of a mobile device may include additional or alternative functions that are not explicitly indicated in FIG. 6. For example, according to some embodiments, RTK correction may be performed on the first carrier-phase measurement, second carrier-phase measurement, and/or WL combination. Additional or alternative features are described hereafter.

At block 610, the functionality comprises obtaining, using a multi-band GNSS receiver of the mobile device (i) a first carrier-phase measurement of a first GNSS signal on a first GNSS carrier frequency, and (ii) a second carrier-phase measurement of a second GNSS signal on second GNSS carrier frequency. As noted, embodiments may use a multi-band GNSS receiver (e.g., a dual-band receiver, tri-band receiver, etc.) capable of receiving a plurality of frequency bands. Some embodiments may use multi-constellation multi-frequency (MCMF) receivers capable of receiving multiple frequency bands on multiple constellations.

In embodiments in which the multi-band GNSS receiver is capable of receiving GNSS signals on three or more carrier frequencies (e.g., a tri-band receiver or receiver capable of receiving more than three bands) different combinations of carrier frequencies may be possible for WL combinations. This may include different WL combinations of carrier frequencies within a single constellation (e.g., two different combinations using GAL) and/or different WL combinations of carrier frequencies across different constellations (e.g., one combination using GPS, two different combinations using GAL, and three combinations using BDS).

The selection of which WL combination to use, and/or whether to use a WL combination at all, may be based on one or more signal characteristics of GNSS signals on various carrier frequencies. As such, some alternative embodiments of the method 600 may further comprise selecting the first GNSS carrier frequency and the second GNSS carrier frequency from a group comprising more than two potential GNSS carrier frequencies, wherein the selecting is based on a signal characteristic of at least one GNSS carrier frequency of the group. For example, a carrier frequency experiencing a high degree of noise (e.g., an SNR below a threshold value) may be omitted from consideration for a WL combination. Other signals may be blocked, may be experiencing a high degree of multipath, etc. Thus, such embodiments may carrier frequencies to use in a WL combination based on real time signal conditions. Alternatively, a preselected/predetermined WL combination may be used, and/or a WL combination of preselected/predetermined carrier frequencies may be selected.

Means for performing functionality at block 610 may comprise a bus 805 processing unit(s) 810, Digital Signal Processor (DSP) 820, wireless communication interface 830 memory 860, PPE 865, GNSS receiver 880, and/or other components of a mobile device 110, as illustrated in FIG. 8.

The functionality at block 620 comprises providing, with the mobile device, a position estimate of the mobile device, wherein (i) the position estimate is determined from a WL combination of the first carrier-phase measurement and the second carrier-phase measurement, and (ii) the WL combination has a combined carrier phase noise that is less than a measured or estimated pseudo-range noise associated with the first carrier phase measurement GNSS carrier frequency and a measured or estimated pseudo-range noise associated with the second GNSS carrier frequency. As noted in the embodiments previously described, the WL combination may comprise a UWL combination where the resulting effective wavelength is large enough to support instantaneous (or near instantaneous) ambiguity fixing. Accordingly, according to some embodiments, the method 600 may further comprise resolving a carrier phase ambiguity of the WL combination to determine the position estimate from the WL combination. The combined carrier phase noise and effective wavelength for the WL combination may vary, as previously indicated in relation to FIG. 4. Specifically, according to some embodiments, the WL combination may have an effective wavelength of 3 m or greater. Additionally or alternatively, the combined carrier phase noise of the WL combination may be two meters or less.

The way in which the position estimate is provided may vary, depending on desired functionality. According to some embodiments, for example, one or more functions of the method 600 may be performed by a particular component or group of components of a mobile device, and/or a particular layer (e.g., low-level hardware or firmware layer) the functionality of the mobile device. In such instances, providing the position estimate may comprise providing the position estimate from one component to another and/or from one layer to another. This may comprise, for example, provide the position estimate from a lower-layer hardware or firmware layer to an operating system and/or an application layer. Additionally or alternatively, providing the position estimate may comprise outputting information indicative of the position estimate via a user interface, such as displaying the location on a screen, indicating the location audibly via a speaker, etc. Additionally or alternatively, providing the position estimate may comprise sending information indicative of the position estimate to another device (e.g., a remote server, a locally-connected devices, etc.). Providing the position estimate to another device may be performed using any of a variety of wired and/or wireless technologies, for example.

According to some embodiments, performing the functions of the functions shown in the blocks of FIG. 6 may be based on determining certain favorable conditions for doing so. For example, according to some embodiments, the method 600 may further comprise determining the position estimate from the WL combination in response to a determination that the combined carrier phase noise is less than the pseudo-range noise of the first carrier-phase measurement and the pseudo-range noise of the second carrier-phase measurement. In such embodiments, the pseudo-range noise of the first carrier-phase measurement, the pseudo-range noise of the second carrier-phase measurement, or both, comprise an estimated pseudo-range noise. Additionally or alternatively, the pseudo-range noise of the first carrier-phase measurement, the pseudo-range noise of the second carrier-phase measurement, or both, comprise a measured pseudo-range noise. As noted hereafter with regard to FIG. 7B, according to some embodiments, determining the position estimate from the WL combination may comprise using the WL combination as an ambiguity constraint for a positioning engine that determines the position estimate.

Means for performing functionality at block 620 may comprise a bus 805 processing unit(s) 810, DSP 820, wireless communication interface 830 memory 860, PPE 865, GNSS receiver 880, and/or other components of a mobile device 110, as illustrated in FIG. 8.

Figure 7A:
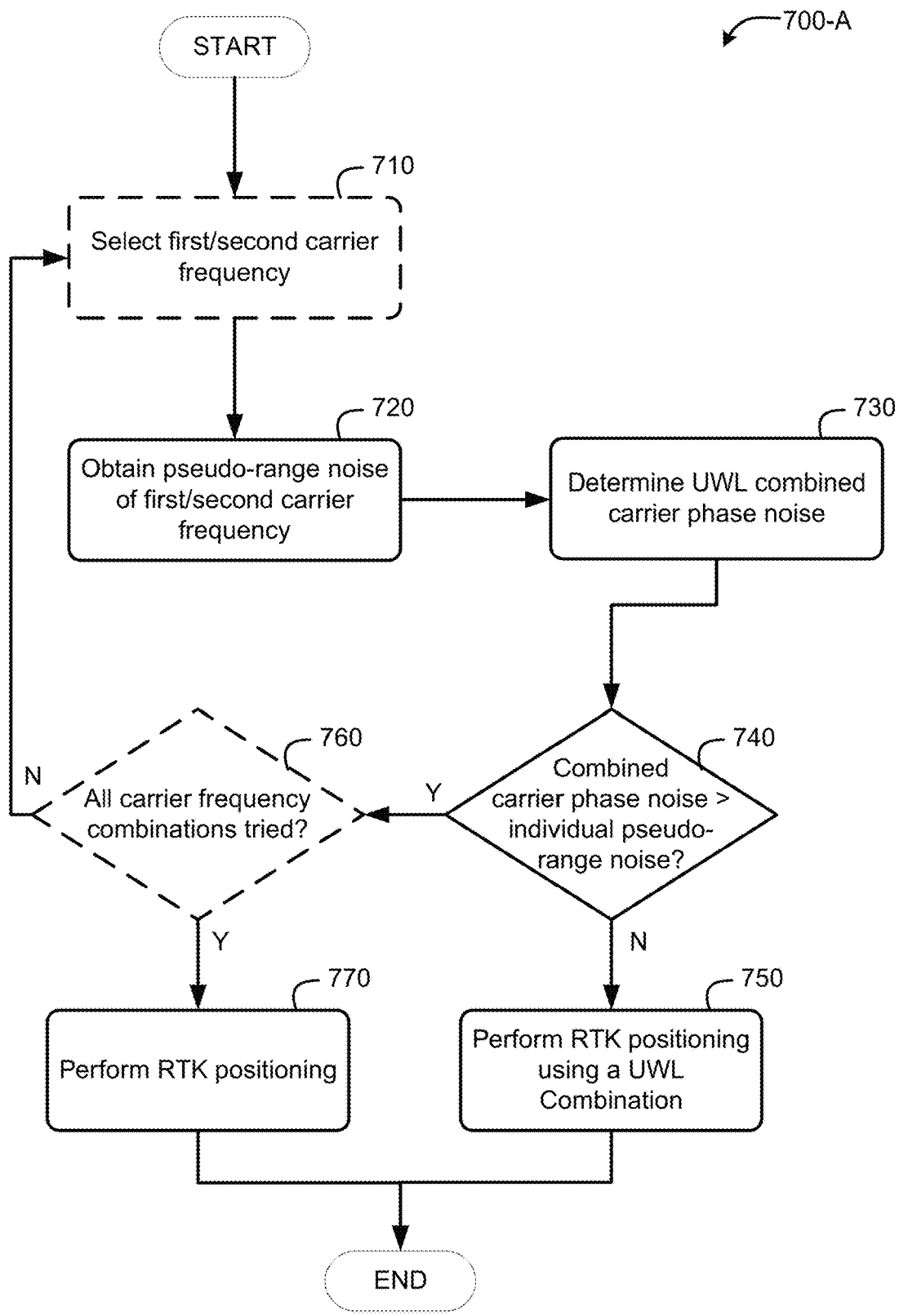
FIGS. 7A-7B are a flow charts illustrating methods for determining whether to perform RTK positioning using a UWL combination (e.g., in the manner illustrated in FIG. 6), according to some embodiments.

FIG. 7A is a flow chart illustrating a method 700-A for determining whether to perform RTK positioning using a UWL combination (e.g., in the manner illustrated in FIG. 6), according to an embodiment. Put differently, the method 700-A illustrates how an embodiment may determine whether to use a UWL combination in the manner described herein when performing RTK positioning. It should be noted, however, that this is only an example and alternative embodiments may utilize UWL combining differently. Alternative embodiments may additionally or alternatively make variations to the functionality illustrated in FIG. 7A.

The use of the method 700-A may vary, depending on desired functionality. For example, the method 700-A may be used in situations where a possible UWL combination could provide a benefit over traditional positioning, such as where traditional RTK positioning may take too long to provide a position estimate and/or where traditional GNSS positioning would fail to provide a sufficiently accurate position estimate. Accordingly, the use of certain applications that could benefit from the use of UWL combinations for RTK positioning as described herein may trigger the use of method 700-A. These applications may comprise, for example, software applications executed by a mobile device (e.g., mobile phone) also capable of executing the method 700-A.

The method 700-A may begin with optional functionality at block 710, where the functionality comprises selecting a first and second carrier frequency. This functionality may be the case, for example, in embodiments in which multiple possible UWL combinations may be made. According to some embodiments, the method 700-A may iterate through different possible UWL combinations of carrier frequencies until a suitable combination is found, allowing the method 700-A to dynamically adapt to real time signal conditions. According to some embodiments, combinations may be prioritized such that embodiments may start at a highest-priority combination and work down to progressively lower-priority combinations if higher-priority combinations are not suitable in a given circumstance for UWL combination. According to some embodiments, the selection operation at block 710 may be omitted if embodiments use a single predetermined UWL combination.

At block 720, the functionality comprises obtaining pseudo-range noise of first and second carrier frequencies. As noted, this may involve obtaining an estimated pseudo-range noise and/or measuring an actual pseudo-range noise. Measuring an actual pseudo-range noise may allow for a more accurate and dynamic implementation, although it may also require additional time and/or processing resources. Obtaining an estimated pseudo-range noise may comprise obtaining the noise from a lookup table (e.g., providing estimated noise for various frequencies given a particular platform), determining the estimated pseudo-range noise from actual historical data of the mobile device, determining the pseudo-range noise in real-time along with position estimation by using the post-fit residual, or the like.

At block 730, the functionality comprises determining the UWL combined carrier phase noise for the WL combination of the first and second carrier frequencies. This determination may be made as described previously (e.g., to determine the values of the right-most column of the table 400 of FIG. 4). According to some embodiments, this determination may be made in real time, based on actual measurements made to obtain the pseudo-range noise at block 720. Alternatively, this determination may be made by using a predetermined lookup table with historical and/or representative values for combined carrier phase noise for the UWL combination of the first and second carrier phase frequencies. In the latter case, the functionality at block 730 alternatively may be performed in parallel or prior to the functionality at block 720.

At block 740, a determination of whether the combined carrier phase noise exceeds the pseudo-range noise of the individual carrier frequencies. If the combined carrier phase noise is not greater than the individual pseudo-range noise then the method 700-A can proceed to block 750 where RTK positioning using a UWL combination of the first and second carrier frequencies is performed. According to some embodiments, the functionality at block 750 may comprise performing the method 600 of FIG. 6.

Otherwise, if the combined carrier phase noise exceeds the pseudo-range noise of the individual carrier frequencies, RTK positioning using the UWL combination may be unable to provide accuracy any better than traditional RTK positioning using individual carrier frequencies. If that is the case, the method 700-B optionally may proceed to block 760, where a determination is made of whether all available carrier frequency combinations have been tried (e.g., across multiple bands of a single constellation and/or multiple constellations). If not, the process can proceed to block 710, where a different selection of carrier frequencies may be made for a potential UWL combination, and the method 700-A can repeat. Again, as previously noted, the method 700-A can cycle through different potential UWL combinations based on a predetermined priority of the combinations, according to some embodiments.

Alternatively, if all carrier frequency combinations have been tried, then the method 700-A may proceed to block 770, where traditional RTK positioning may be performed. According to some embodiments, if traditional RTK positioning is performed, the method 700-A may be repeated at some future point (e.g., after a threshold period of time, after a threshold number of epochs, etc.), to allow for a possible UWL combination if conditions for using a UWL combination improve.

Figure 7B:
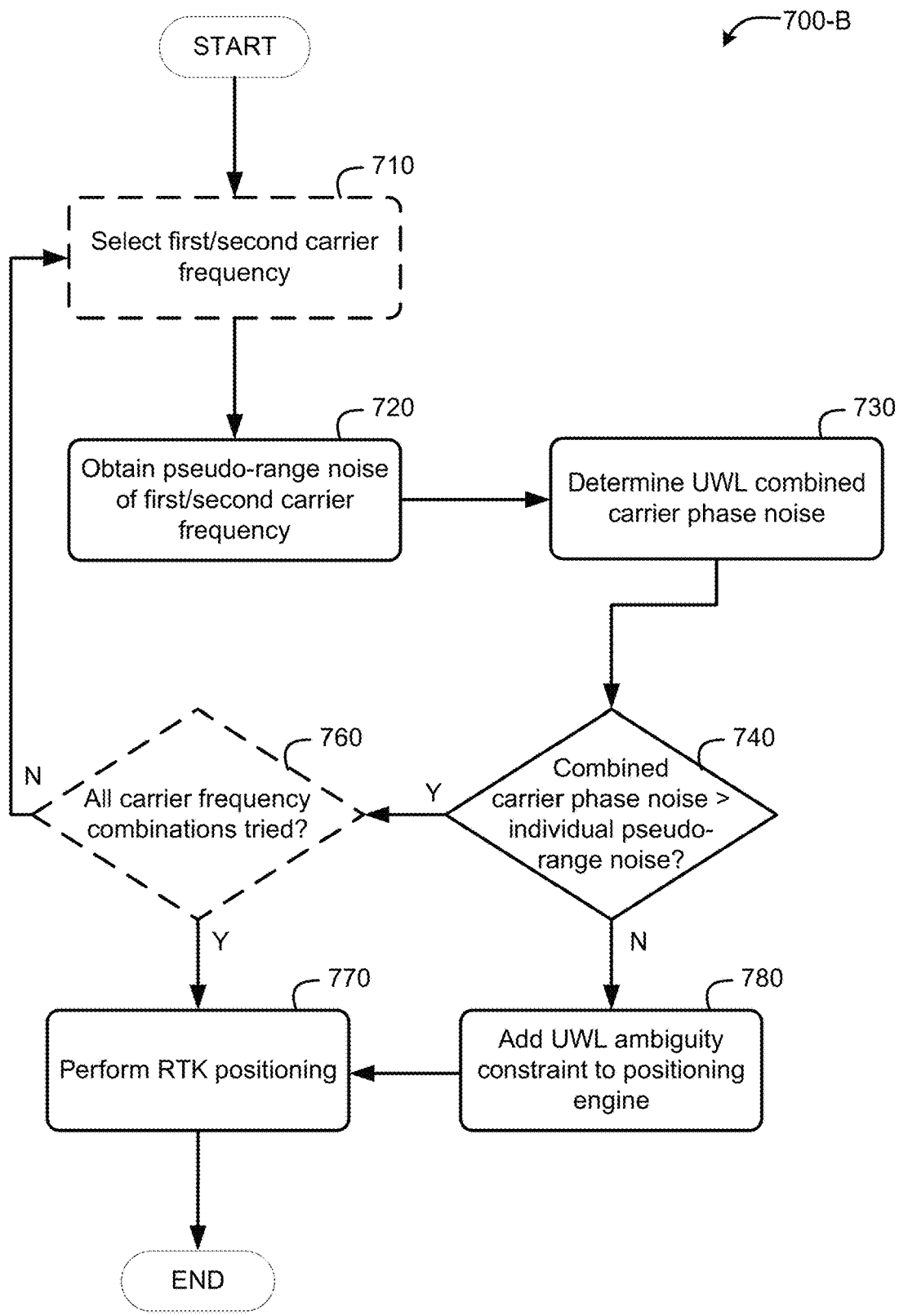

FIG. 7B is a flow chart illustrating another method 700-B for determining whether to perform RTK positioning using a UWL combination, according to an embodiment. As can be seen, the method 700-B is similar to the method 700-A of FIG. 7A and most operations. Here, however, RTK positioning based on a UWL combination may be implemented by, as indicated at block 780, adding a UWL ambiguity constraint to a positioning engine (e.g., PPE) that performs RTK positioning. For example, ambiguities from the positioning engine for first and second carrier frequencies can be used to form a new UWL ambiguity. This new UWL ambiguity can then be used to perform a search to fix the ambiguities of the first and second carrier frequencies to integers, which can then be provided to the positioning engine for RTK positioning (at block 770). Thus, in this embodiment, the UWL ambiguity constraint can be used a form of feedback that enables a PPE engine to provide UWL RTK positioning.

FIG. 8 is a block diagram of various hardware and software components of a mobile device 110, according to an embodiment. These components can be utilized as described herein above (e.g. in association with FIGS. 1-7). For example, the mobile device 110 can perform the operations of the methods illustrated in FIGS. 6, 7A, and 7B, and/or one or more of the functions of a mobile device 110 as described in the embodiments herein. It should be noted that FIG. 8 is meant only to provide a generalized illustration of various components, any or all of which may be utilized as appropriate. As previously noted, mobile device 110 may vary in form and function, and may ultimately comprise any GNSS-enabled device, including vehicles, commercial and consumer electronic devices, survey equipment, and more. Thus, in some instances, components illustrated by FIG. 8 can be localized to a single physical device and/or distributed among various networked devices, which may be disposed at different physical locations (e.g., different locations of a vehicle). It can be further noted that reference stations may utilize hardware and/or software components similar to the mobile device 110.

The mobile device 110 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as DSP chips, graphics processing units (GPUs), application specific integrated circuits (ASICs), and/or the like), and/or other processor, processing structure, or processing means. As shown in FIG. 8, some embodiments may have a separate DSP 820, depending on desired functionality. Location determination and/or other determinations based on wireless communication may be provided in the processing unit(s) 810 and/or wireless communication interface 830 (discussed below). The mobile device 110 also can include one or more input devices 870, which can include without limitation a keyboard, touch screen, a touch pad, microphone, button(s), dial(s), switch(es), and/or the like; and one or more output devices 815, which can include without limitation a display, light emitting diode (LED), speakers, and/or the like. As will be appreciated, the type of input devices 870 and output devices 815 may depend on the type of mobile device 110 with which the input devices 870 and output devices 815 are integrated.

The mobile device 110 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the mobile device 110 to communicate via networks and/or directly with other devices as described herein. The wireless communication interface 830 may permit data and signaling to be communicated (e.g. transmitted and received) with a network, for example, via WAN access points, cellular base stations and/or other access node types, and/or other network components, computer systems, and/or any other electronic devices described herein. The communication can be carried out via one or more wireless communication antenna(s) 832 that send and/or receive wireless signals 834. The antenna(s) 832 may comprise one or more discrete antennas, one or more antenna arrays, or any combination.

Depending on desired functionality, the wireless communication interface 830 may comprise separate transceivers, a separate receiver and transmitter, or any combination of transceivers, transmitters, and/or receivers to communicate with base stations and other terrestrial transceivers, such as wireless devices and access points. The mobile device 110 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. CDMA2000® includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, 5G NR, 6G, and so on. 5G NR, LTE, LTE Advanced, GSM, and WCDMA are described in documents from the Third Generation Partnership Project (3GPP™). CDMA2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The mobile device 110 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the location determination described herein, in some instances.

Embodiments of the mobile device 110 may also include a GNSS receiver 880 capable of receiving signals 884 from one or more GNSS satellites (e.g., SVs 140) as described herein using an antenna 882 (which could be the same as antenna 832). The GNSS receiver 880 can extract a position of the mobile device 110, using conventional techniques, from GNSS SVs of a GNSS system (e.g., SVs 140 of FIG. 3), such as GPS, GAL, Global Navigation Satellite System (GLONASS), Quasi-Zenith Satellite System (QZSS) over Japan, Indian Regional Navigational Satellite System (IRNSS) over India, Beidou Navigation Satellite System (BDS) over China, and/or the like. Moreover, the GNSS receiver 880 can be used with various augmentation systems (e.g., Satellite-based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 illustrated in FIG. 8 is illustrated as a component distinct from other components within a mobile device 110, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 810, DSP 820, and/or a processing unit within the wireless communication interface 830 (e.g., in a modem). A GNSS receiver may optionally also include a positioning engine, such as those described herein (e.g., a an Kalman filter, WLS, hatch filter, particle filter, etc.), which can use GNSS measurements from the measurement engine and RTK correction information to determine a position of the GNSS receiver. The positioning engine may also be executed by one or more processing units, such as processing unit(s) 810 and/or DSP 820.

The mobile device 110 may further include and/or be in communication with a memory 860. The memory 860 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the mobile device 110 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the mobile device 110 (and/or processing unit(s) 810 or DSP 820 within mobile device 110). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device or system is capable of manipulating or transforming signals, typically represented as physical electronic, electrical, or magnetic quantities within memories, registers, or other information storage devices, transmission devices, or display devices of the special purpose computer or similar special purpose electronic computing device or system.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure as defined by the appended claims. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of Global Navigation Satellite System (GNSS) positioning of a mobile device, the method comprising: obtaining, using a multi-band GNSS receiver of the mobile device: a first carrier-phase measurement of a first GNSS signal on a first GNSS carrier frequency, and a second carrier-phase measurement of a second GNSS signal on second GNSS carrier frequency; and providing, with the mobile device, a position estimate of the mobile device, wherein: the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

Clause 2: The method of clause 1, wherein determining the position estimate from the WL combination comprises using the WL combination as an ambiguity constraint for a positioning engine that determines the position estimate.

Clause 3: The method of any of clauses 1-2 further comprising, determining the position estimate from the WL combination in response to a determination that the combined carrier phase noise is less than the pseudo-range noise of the first carrier-phase measurement and the pseudo-range noise of the second carrier-phase measurement.

Clause 4: The method of any of clauses 1-3, wherein the pseudo-range noise of the first carrier-phase measurement, the pseudo-range noise of the second carrier-phase measurement, or both, comprise an estimated pseudo-range noise.

Clause 5: The method of any of clauses 1-3, wherein the pseudo-range noise of the first carrier-phase measurement, the pseudo-range noise of the second carrier-phase measurement, or both, comprise a measured pseudo-range noise.

Clause 6: The method of any of clauses 1-5 further comprising, selecting the first GNSS carrier frequency and the second GNSS carrier frequency from a group comprising more than two potential GNSS carrier frequencies, wherein the selecting is based on a signal characteristic of at least one GNSS carrier frequency of the group.

Clause 7: The method of any of clauses 1-6 further comprising, resolving a carrier phase ambiguity of the WL combination to determine the position estimate from the WL combination.

Clause 8: The method of any of clauses 1-7, wherein the WL combination has an effective wavelength 3 meters or greater.

Clause 9: The method of any of clauses 1-8, wherein the combined carrier phase noise of the WL combination is 2 meters or less.

Clause 10: The method of any of clauses 1-9, wherein the mobile device comprises a mobile phone.

Clause 11: A mobile device for Global Navigation Satellite System (GNSS) positioning of a mobile device, the mobile device comprising: a multi-band GNSS receiver; a memory; and one or more processors communicatively coupled with the multi-band GNSS receiver and the memory, wherein the one or more processors are configured to: obtain, using a multi-band GNSS receiver of the mobile device: a first carrier-phase measurement of a first GNSS signal on a first GNSS carrier frequency, and a second carrier-phase measurement of a second GNSS signal on second GNSS carrier frequency; and provide a position estimate of the mobile device, wherein: the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

Clause 12: The mobile device of clause 11, wherein the one or more processors, when determining the position estimate from the WL combination, are configured to use the WL combination as an ambiguity constraint for a positioning engine that determines the position estimate.

Clause 13: The mobile device of any of clauses 11-12, wherein the one or more processors are further configured to determine the position estimate from the WL combination in response to a determination that the combined carrier phase noise is less than the pseudo-range noise of the first carrier-phase measurement and the pseudo-range noise of the second carrier-phase measurement.

Clause 14: The mobile device of any of clauses 11-13, wherein the pseudo-range noise of the first carrier-phase measurement, the pseudo-range noise of the second carrier-phase measurement, or both, comprise an estimated pseudo-range noise.

Clause 15: The mobile device of any of clauses 11-13, wherein the pseudo-range noise of the first carrier-phase measurement, the pseudo-range noise of the second carrier-phase measurement, or both, comprise a measured pseudo-range noise.

Clause 16: The mobile device of any of clauses 11-15, wherein the one or more processors are further configured to select the first GNSS carrier frequency and the second GNSS carrier frequency from a group comprising more than two potential GNSS carrier frequencies, wherein the selecting is based on a signal characteristic of at least one GNSS carrier frequency of the group.

Clause 17: The mobile device of any of clauses 11-16, wherein the one or more processors are further configured to resolve a carrier phase ambiguity of the WL combination to determine the position estimate from the WL combination.

Clause 18: The mobile device of any of clauses 11-17, wherein the mobile device comprises a mobile phone.

Clause 19: An apparatus for Global Navigation Satellite System (GNSS) positioning of a mobile device, the apparatus comprising: means for obtaining, using a multi-band GNSS receiver of the mobile device: a first carrier-phase measurement of a first GNSS signal on a first GNSS carrier frequency, and a second carrier-phase measurement of a second GNSS signal on second GNSS carrier frequency; and means for providing, with the mobile device, a position estimate of the mobile device, wherein: the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

Clause 20: The apparatus of clause 19, further comprising means for determining the position estimate from the WL combination, wherein the means for determining comprises means for using the WL combination as an ambiguity constraint for a positioning engine that determines the position estimate.

Clause 21: The apparatus of any of clauses 19-20 further comprising, means for determining the position estimate from the WL combination in response to a determination that the combined carrier phase noise is less than the pseudo-range noise of the first carrier-phase measurement and the pseudo-range noise of the second carrier-phase measurement.

Clause 22: The apparatus of any of clauses 19-21 further comprising, means for selecting the first GNSS carrier frequency and the second GNSS carrier frequency from a group comprising more than two potential GNSS carrier frequencies, wherein the selecting is based on a signal characteristic of at least one GNSS carrier frequency of the group.

Clause 23: The apparatus of any of clauses 19-22 further comprising, means for resolving a carrier phase ambiguity of the WL combination to determine the position estimate from the WL combination.

Clause 24: The apparatus of any of clauses 19-23, wherein the mobile device comprises a mobile phone.

Clause 25: A non-transitory computer-readable medium storing instructions for Global Navigation Satellite System (GNSS) positioning of a mobile device, the instructions comprising code for: obtaining, using a multi-band GNSS receiver of the mobile device: a first carrier-phase measurement of a first GNSS signal on a first GNSS carrier frequency, and a second carrier-phase measurement of a second GNSS signal on second GNSS carrier frequency; and providing, with the mobile device, a position estimate of the mobile device, wherein: the position estimate is determined from a wide-lane (WL) combination of the first carrier-phase measurement and the second carrier-phase measurement, and the WL combination has a combined carrier phase noise that is less than a pseudo-range noise of the first carrier-phase measurement and a pseudo-range noise of the second carrier-phase measurement.

Clause 26: The computer-readable medium of clause 25, wherein determining the position estimate from the WL combination comprises using the WL combination as an ambiguity constraint for a positioning engine that determines the position estimate.

Clause 27: The computer-readable medium of any of clauses 25-26, wherein the instructions further comprise code for determining the position estimate from the WL combination in response to a determination that the combined carrier phase noise is less than the pseudo-range noise of the first carrier-phase measurement and the pseudo-range noise of the second carrier-phase measurement.

Clause 28: The computer-readable medium of any of clauses 25-27, wherein the instructions further comprise code for selecting the first GNSS carrier frequency and the second GNSS carrier frequency from a group comprising more than two potential GNSS carrier frequencies, wherein the selecting is based on a signal characteristic of at least one GNSS carrier frequency of the group.

Clause 29: The computer-readable medium of any of clauses 25-28, wherein the instructions further comprise code for resolving a carrier phase ambiguity of the WL combination to determine the position estimate from the WL combination.

Clause 30: The computer-readable medium of any of clauses 25-29, wherein the mobile device comprises a mobile phone.

What is claimed is:

1. A method of Global Navigation Satellite System (GNSS) positioning of a mobile device, the method comprising:
obtaining, using a multi-band GNSS receiver of the mobile device:
a first carrier-phase measurement of a first GNSS signal on a first GNSS carrier frequency, and
a second carrier-phase measurement of a second GNSS signal on second GNSS carrier frequency;
determining a wide-lane (WL) combination of the first carrier-phase measurement and the second carrier-phase measurement;
determining a combined carrier phase noise of the WL combination; and
responsive to a determination that the combined carrier phase noise of the WL combination is (i) less than a measured or estimated pseudo-range noise associated with the first GNSS carrier frequency and (ii) less than a measured or estimated pseudo-range noise associated with the second GNSS carrier frequency, providing, with the mobile device, a position estimate of the mobile device, wherein the position estimate is determined from the WL combination.

2. The method of claim 1, wherein determining the position estimate from the WL combination comprises using the WL combination as an ambiguity constraint for a positioning engine that determines the position estimate.

3. The method of claim 1, wherein the measured or estimated pseudo-range noise associated with the first GNSS carrier frequency, the measured or estimated pseudo-range noise associated with the second GNSS carrier frequency, or both, comprise an estimated pseudo-range noise.

4. The method of claim 1, wherein the measured or estimated pseudo-range noise associated with the first GNSS carrier frequency, the measured or estimated pseudo-range noise associated with the second GNSS carrier frequency, or both, comprise a measured pseudo-range noise.

5. The method of claim 1, further comprising selecting the first GNSS carrier frequency and the second GNSS carrier frequency from a group comprising more than two potential GNSS carrier frequencies, wherein the selecting is based on a signal characteristic of at least one GNSS carrier frequency of the group and wherein the obtaining the first carrier-phase measurement and the second carrier-phase measurement is responsive to the selecting.

6. The method of claim 1, further comprising resolving a carrier phase ambiguity of the WL combination to determine the position estimate from the WL combination.

7. The method of claim 1, wherein the WL combination has an effective wavelength 3 meters or greater.

8. The method of claim 1, wherein the combined carrier phase noise of the WL combination is 2 meters or less.

9. The method of claim 1, wherein the mobile device comprises a mobile phone.

10. A mobile device for Global Navigation Satellite System (GNSS) positioning of a mobile device, the mobile device comprising:
a multi-band GNSS receiver;
a memory; and
one or more processors communicatively coupled with the multi-band GNSS receiver and the memory, wherein the one or more processors are configured to:
obtain, using the multi-band GNSS receiver:
a first carrier-phase measurement of a first GNSS signal on a first GNSS carrier frequency, and
a second carrier-phase measurement of a second GNSS signal on second GNSS carrier frequency;
determine a wide-lane (WL) combination of the first carrier-phase measurement and the second carrier-phase measurement;
determine a combined carrier phase noise of the WL combination; and
responsive to a determination that the combined carrier phase noise of the WL combination is (i) less than a measured or estimated pseudo-range noise associated with the first GNSS carrier frequency and (ii) less than a measured or estimated pseudo-range noise associated with the second GNSS carrier frequency, provide a position estimate of the mobile device, wherein the position estimate is determined from the WL combination.

11. The mobile device of claim 10, wherein the one or more processors, when determining the position estimate from the WL combination, are configured to use the WL combination as an ambiguity constraint for a positioning engine that determines the position estimate.

12. The mobile device of claim 10, wherein the measured or estimated pseudo-range noise associated with the first GNSS carrier frequency, the measured or estimated pseudo-range noise associated with the second GNSS carrier frequency, or both, comprise an estimated pseudo-range noise.

13. The mobile device of claim 10, wherein the measured or estimated pseudo-range noise associated with the first GNSS carrier frequency, the measured or estimated pseudo-range noise associated with the second GNSS carrier frequency, or both, comprise a measured pseudo-range noise.

14. The mobile device of claim 10, wherein the one or more processors are further configured to select the first GNSS carrier frequency and the second GNSS carrier frequency from a group comprising more than two potential GNSS carrier frequencies, wherein the selecting is based on a signal characteristic of at least one GNSS carrier frequency of the group and wherein the one or more processors are further configured to perform the obtaining of the first carrier-phase measurement and the second carrier-phase measurement responsive to the selecting.

15. The mobile device of claim 10, wherein the one or more processors are further configured to resolve a carrier phase ambiguity of the WL combination to determine the position estimate from the WL combination.

16. The mobile device of claim 10, wherein the mobile device comprises a mobile phone.

17. An apparatus for Global Navigation Satellite System (GNSS) positioning of a mobile device, the apparatus comprising:
    means for obtaining, using a multi-band GNSS receiver of the mobile device:
        a first carrier-phase measurement of a first GNSS signal on a first GNSS carrier frequency, and
        a second carrier-phase measurement of a second GNSS signal on second GNSS carrier frequency;
    means for determining a wide-lane (WL) combination of the first carrier-phase measurement and the second carrier-phase measurement;
    means for determining a combined carrier phase noise of the WL combination; and
    means for providing, with the mobile device and responsive to a determination that the combined carrier phase noise of the WL combination is (i) less than a measured or estimated pseudo-range noise associated with the first GNSS carrier frequency and (ii) less than a measured or estimated pseudo-range noise associated with the second GNSS carrier frequency, a position estimate of the mobile device, wherein the position estimate is determined from the WL combination.

18. The apparatus of claim 17, further comprising means for determining the position estimate from the WL combination, wherein the means for determining comprises means for using the WL combination as an ambiguity constraint for a positioning engine that determines the position estimate.

19. The apparatus of claim 17, further comprising means for selecting the first GNSS carrier frequency and the second GNSS carrier frequency from a group comprising more than two potential GNSS carrier frequencies, wherein the selecting is based on a signal characteristic of at least one GNSS carrier frequency of the group and wherein the obtaining the first carrier-phase measurement and the second carrier-phase measurement is responsive to the selecting.

20. The apparatus of claim 17, further comprising means for resolving a carrier phase ambiguity of the WL combination to determine the position estimate from the WL combination.

21. The apparatus of claim 17, wherein the mobile device comprises a mobile phone.

22. A non-transitory computer-readable medium storing instructions for Global Navigation Satellite System (GNSS) positioning of a mobile device, the instructions comprising code for:
    obtaining, using a multi-band GNSS receiver of the mobile device:
        a first carrier-phase measurement of a first GNSS signal on a first GNSS carrier frequency, and
        a second carrier-phase measurement of a second GNSS signal on second GNSS carrier frequency;
    determining a wide-lane (WL) combination of the first carrier-phase measurement and the second carrier-phase measurement;
    determining a combined carrier phase noise of the WL combination; and
    responsive to a determination that the combined carrier phase noise of the WL combination is (i) less than a measured or estimated pseudo-range noise associated with the first GNSS carrier frequency and (ii) less than a measured or estimated pseudo-range noise associated with the second GNSS carrier frequency, providing, with the mobile device, a position estimate of the mobile device, wherein the position estimate is determined from the WL combination.

23. The computer-readable medium of claim 22, wherein determining the position estimate from the WL combination comprises using the WL combination as an ambiguity constraint for a positioning engine that determines the position estimate.

24. The computer-readable medium of claim 22, wherein the instructions further comprise code for selecting the first GNSS carrier frequency and the second GNSS carrier frequency from a group comprising more than two potential GNSS carrier frequencies, wherein the selecting is based on a signal characteristic of at least one GNSS carrier frequency of the group and wherein the obtaining the first carrier-phase measurement and the second carrier-phase measurement is responsive to the selecting.

25. The computer-readable medium of claim 22, wherein the instructions further comprise code for resolving a carrier phase ambiguity of the WL combination to determine the position estimate from the WL combination.

26. The computer-readable medium of claim 22, wherein the mobile device comprises a mobile phone.

* * * * *